R. N. ROGERS.
PAPER FEEDER.
APPLICATION FILED OCT. 5, 1909.

1,153,339.

Patented Sept. 14, 1915.
8 SHEETS—SHEET 8.

Fig. 15.

Witnesses
R. L. Farrington
John R. Lepore

Inventor:
Russell N. Rogers
by  Attys.

UNITED STATES PATENT OFFICE.

RUSSELL N. ROGERS, OF CHICAGO, ILLINOIS, ASSIGNOR, BY MESNE ASSIGNMENTS, TO ADDRESSOGRAPH COMPANY, OF CHICAGO, ILLINOIS, A CORPORATION OF ILLINOIS.

PAPER-FEEDER.

1,153,339.   Specification of Letters Patent.   Patented Sept. 14, 1915.

Application filed October 5, 1909.  Serial No. 521,115.

*To all whom it may concern:*

Be it known that I, RUSSELL N. ROGERS, a citizen of the United States, and a resident of Chicago, Cook county, Illinois, have invented certain new and useful Improvements in Paper-Feeders, of which the following is a full, clear, and exact description.

My invention relates to paper feeders, and particularly to paper feeders for use in connection with addressing machines.

One of the objects of my invention is to simplify and improve the construction of paper feeders and provide a paper feeder which is capable of receiving and delivering paper of various descriptions, such, for instance, as envelops, paper sheets, tags and the like.

The several parts of my invention particularly as applied to one form of addressing machines, will be readily understood by reference to the accompanying drawings, which illustrate the preferred form of my invention applied to an addressing machine.

My invention is capable of embodiment in various forms; and several of its essential elementary mechanisms and parts while co-dependent in the machine herein illustrated, are capable of employment alone or in conjunction with less than the whole number of said mechanisms.

As will be understood from the following, the invention is not confined to the specific structures illustrated in the drawings, as both the construction and arrangement of the elements and parts thereof may be readily modified without departing from the spirit of the invention.

The embodiment of the invention here illustrated is applicable to a small compact machine adapted to be placed upon a desk or table and to be operated by a person standing or sitting beside it. The machine is of the class in which address carriers or type plates are employed or used repeatedly with successive lots of envelops, bill heads, cards or sheets. Its operation is very rapid and yet so simple that even an unskilled person may use it with success.

For the sake of clearness I have described my invention in relation to a complete addressing machine for use in connection with which it is particularly applicable, and in describing this machine and my invention the various mechanisms will be referred to in the following order: The frame; on which all the other members and mechanisms are mounted. The rotary printing mechanism; by which the type are impressed on the envelops. The envelop holder; which is adapted to contain a supply of envelops. The envelop feeding mechanism; which automatically feeds the envelops one at a time from the holder to the printing mechanism. The type plate magazine; which is adapted to contain a stack of type plates. The type inking mechanism; for inking the type of successive plates. The type plate conveyer; by which the type plates are removed from the magazine and conveyed to the printing mechanism. The type plate receiver; which receives the plates as they emerge from the printing mechanism. The type plate repacking mechanism; by which the used plates are rearranged or repacked in the receiver.

The frame, for convenience, is made in several parts, namely, the side frames, 1—1, having feet to rest upon a desk or table:— a bottom plate or spreader 2:—a top or bed plate 3:—and two carefully alined lateral extensions, 4—4. The spreader, 2, which connects the lower parts of the side frames, is provided with a depressed, level, middle portion, 2', bordered by two guide flanges, 2", and serves as a shelf for the plate container or drawer. The rear end of the spreader is provided with upstanding flanges, 2''', which are stops for the plate drawer. The bed plate, 3, occupies, preferably, a horizontal plane and is secured between the top rails of the side frames, 1—1. This plate serves as a support for the type plates in their movement from end to end of the frame, and its upper surface contains parallel grooves, 3', for the hereinafter described conveyer belts or chain. These grooves, being of sufficient width, accommodate the plate propelling lugs on the conveyer belts; also the ribs of the type plates, as hereinafter described. The edges of the bed plate, at the inner sides of the grooves, 3', act as guides for the type plates. The extensions, 4—4, provide the bearings for the several shafts of the printing and envelop feeding mechanisms.

The printing mechanism has as its principal members, the rolls, 5 and 6. These are fixed upon the shafts 7 and 8, respectively. The length of the roll, 5, about equals the width of a type plate. The shaft, 7, extends through, and has fixed bearings in, the frame members, 1 and 4; while the shaft 8, is arranged in vertically movable bearing blocks, 9—9, which permit the shaft 8, and the platen roll, 6, to be raised when necessary. The blocks, 9, are slidably held in vertical guides, 1ª, formed on the tops of the lateral extensions, 4, directly above the shaft, 7. Vertical feathers, shown in Figs. 1 and 3, prevent endwise movement of the block, 9, with the shaft, 8. The blocks, 9, are limited, as to upward movement by followers, 10, arranged in respective guide pillars, and springs act to hold the blocks down, whereby the right pressure of the platen roll, 6, on the type may be secured. The construction of these bearings is shown in detail in Figs. 1, 2 and 3. The followers, 10, fit in the top of respective pillars and are secured by U shaped clips, 11, which occupy horizontal grooves in the blocks and the pillars. The space, 12, between the blocks 9 and 10, in each case, is occupied by the lower end of a stop screw, 13, that is adjustable in the follower block, 10. The screw is hollow and contains the spring, 14, followed by a lesser screw, 15, in the head of screw, 13. The spring, 14, exerts its pressure on block, 9, through the medium of a screw, 16, which passes through the end of the stop screw and into the top of the block, 9. Upon withdrawing the clips, 11, the follower, 10, may be lifted as 1 with it the block 9 and shaft 8, these parts being connected to the follower by the headed screw, 16. It will be noted that a space somewhat less than the combined thickness of an envelop and a type plate, always remains between the rolls, 5 and 6. The distance is not increased in the usual printing operation; but only when necessary to free an unusually thick article. The shaft, 7, is rotated by means of a crank, 17, connected thereto by a one way clutch, 18, of which the spring 18' is a necessary part. The rolls, 5 and 6, must rotate at substantially the same peripheral speeds. The shafts 7 and 8, therefore, are connected by properly proportioned gearing. As best suited to the purpose, I employ a train of beveled gears, shown in Fig. 2. These gears are inclosed in a two part casing, the lower portion, 19, whereof, is journaled or held on the end of shaft 7, while the upper casing portion 20, is attached to the block 9. The part 19 contains an upright shaft, 21, held against longitudinal movement therein. Beveled gears 7' and 21' join the shafts 7 and 21. Like, properly proportioned, beveled gears, 8' and 21'', are arranged in the upper part of the casing, the hub of the gear 21'' being journaled in the casing. Said hub contains a pin or feather, which enters a groove, 21''', in the shaft 21, forming a connection which allows the pinion 21'' to rise and fall with the bearing block 9, while being rotated by the shaft 21. When the upper roll is removed (as before explained) the upper part of the gear casing is also removed, the gear 21'' at such time pulling off the shaft 21. No readjustments are required when the roll shaft and gears are restored to position. The bearings of the shaft 8 are far enough apart to admit the widest envelop or sheet to be printed and allow it to pass between the printing rolls. The shaft 8 parallels the top of the machine frame (the laterals) and, obviously, the opening which extends from pillar to pillar, permits the printing of a sheet that is much wider than the printing rolls, 5 and 6, adapting the machine to a wide range of work.

*The envelop holder.*—When the word "envelop" is used herein, it is intended to include envelops, cards, sheets and the like. As these vary in size, from small envelops and tags to the largest wrappers and letter sheets in ordinary use, I make the envelop holder adjustable, to the end that it may be easily expanded or contracted, to suit the work in hand. I furthermore construct and attach the envelop holder to the frame of the machine in such manner that it may be bodily shifted from side to side, so that the imprint of the type may be placed on any desired portion of the envelop or sheet.

Another feature of my novel envelop holder resides in a construction which permits the envelops to occupy different angles or positions therein, as best suits the quality and nature of the paper.

Referring now to the drawings 22, 22, represent the wings or side plates of the envelop holder. These plates have bottom flanges, 22', to give them stability; and the latter are freely slidable in the grooves, 23', of the long transverse bar, 23. The means for supporting this bar above and fixing it on the frame will be described hereinafter. The bar, 23, extends from end to end of the laterals, 4, and, obviously, the wings 22, may be moved lengthwise thereof. After adjustment on the bar, the wings are secured by small set screws, 22'', in their flanges, see Fig. 3. The spacing of the wings or end plates closely corresponds to the width of the envelops for which they are guides. The top surface, 23'', of the bar, 23, is a flat or slightly inclined ridge, adjacent to the upper printing roll, and forms a portion of the bottom of the envelop holder; it will be referred to again. For the rest, the envelop holder has two bottoms 24 and 25, one (24) which is preferably fixed, and the other (25) movable and adjustable. These bottoms are substantially the same in construction being lazy tong bars that have their ends fastened to the end plates, 22. The ends of the collapsible bar, 24, are firmly secured to the plates, the fastenings fixing the general inclination of the bar. Parallel strips, 24', pivotally and slidably attached to different parts of the lazy tong bar, provide a smooth bottom or sliding surface for the envelops. The ends of the lazy tong bar, 25, are equipped with swivel gears, 25', having studs that extend through holes, 22ª, in the end plates, 22. They are secured by thumb nuts, 25''. Each plate, 22, has several holes and when the thumb nuts, 25'' are removed the collapsible bar, 25, may be taken from one pair of holes and placed in another to thereby adjust the bar forward and back. Parallel strips or bars, 25ª, attached to the links of bar, 25, prevent the sagging thereof and provide smooth rests for the paper. The lower ends of the bars, 25ª, rest on the lower bar, 24. By the adjustment of the upper bar, 25, referred to, the envelops may be pitched at different angles with respect to the printing roll, and by removing the upper bar and using the lower bar as a floor or support, the pitch of the envelops with respect to the printing roll may be materially reduced. Ordinarily, the upper bar, 25, is used, most articles requiring steep inclination. The collapsible bars or lazy tongs, obviously, provide an extensible and collapsible bottom for the envelop holder. The parallel bars are at all times maintained in parallelism and support the paper at equidistant points between the side plates or wings, on all positions or adjustment of said wings. Attention is called to the fact that the two collapsible bars and the ridge, 23'', present a compound break or angle at the bottom of the envelop holder, which insures the rapid and uniform settling of the sheets or envelops toward and against the adjacent roll. The effective width of this break or angle, in a measure determines the thickness of the pack of envelops that may be placed in the holder. Greater or less space is allowed by changing the pitch of the bars, 25ª.

Figures 12, 13, 14:
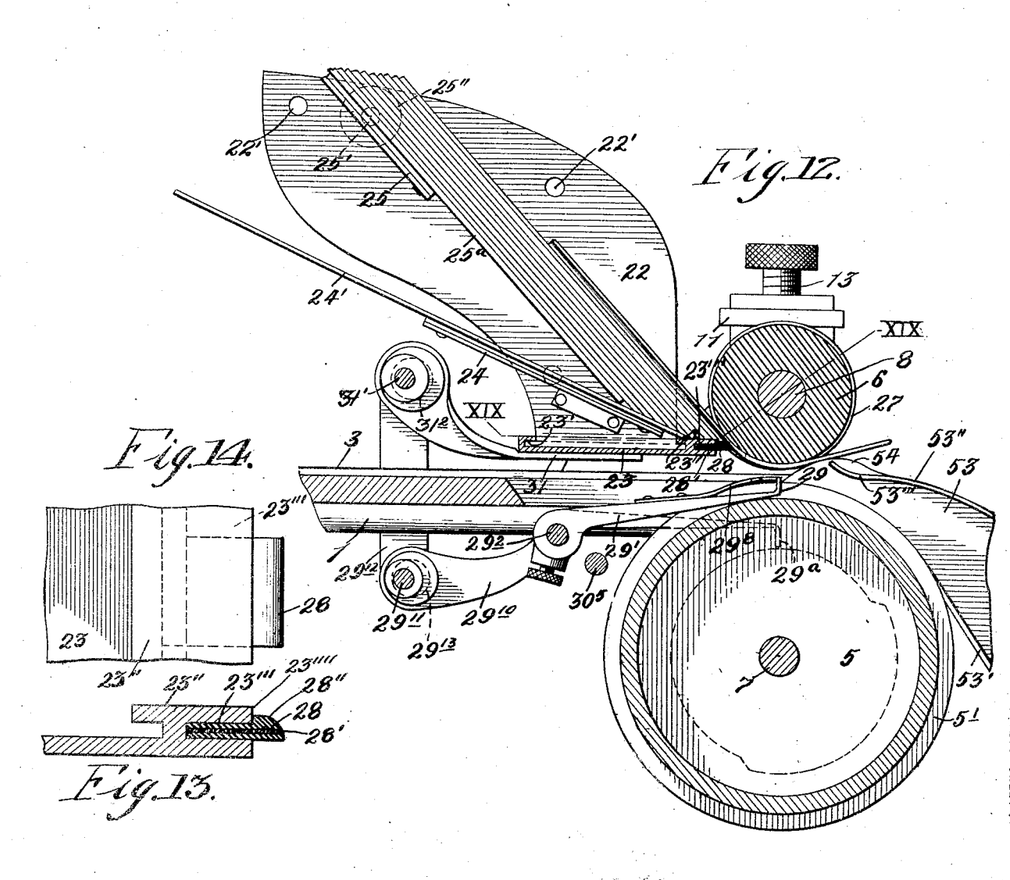
Fig. 12 is an enlarged sectional view of the printing mechanism and the co-acting parts of the envelop or paper feeding mechanism.
Fig. 13 is a further enlarged cross section of the feed bar and a second envelop supporting or restraining device thereon.
Fig. 14 is a plan view thereof.
Figure 15:
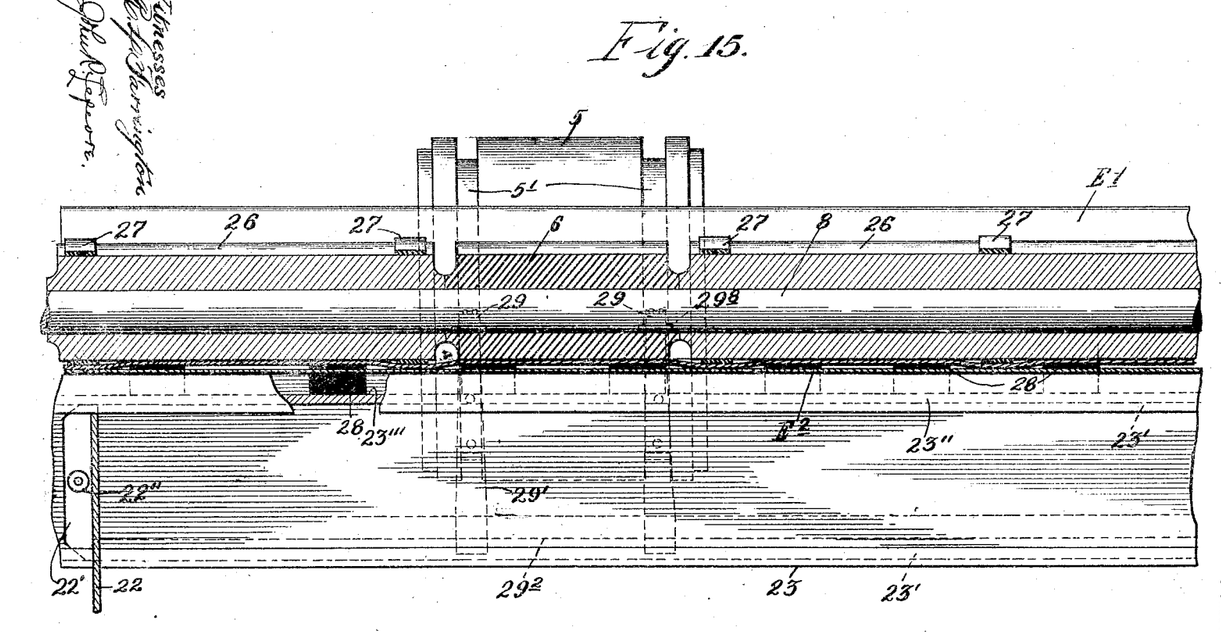
Fig. 15 is a sectional view on the line XIX— of Fig. 12.

*The envelop feeding mechanism.*—It is evident that my envelop holder may be used as a mere manual convenience in feeding envelops, one by one, to the printing mechanism; but such use is not intended, for by the addition of a few simple parts upon and adjacent to the bar, 23, and shaft, 8, I am able to make the feeding of the envelops automatic. The parts referred to, are two roll sections, 26, 26, on the shaft, 8; certain rubber bands or peripheral surfaces, 27, thereon; several small projections or fingers, 28, on the edge of the bar, 23, and certain stop-and-release dogs 29, arranged beneath the roll. Other parts that lend themselves to the ready adjustment of relations between the members, 26, 27, 28 and 29, will be pointed out later. The rolls, 26, are fixed on the shaft, 8, and are of substantially the same diameter as the platen or pressure roll, 6. On each of these rolls, 26, I preferably place, two or more of the rubber bands, 27; these project from the surfaces of respective rolls, 26, and present peripheries of slightly greater circumference. The long rolls, 26—26, allow the easy transverse adjustment of the bands, 27. This is one reason for preferring these rolls, but it should be understood that the rubber bands may be mounted on independently adjustable rolls, or pulleys, to take the place of the long rolls on shaft, 8. The fingers or projections, 28, extend from the edge of the bar, 23, almost into contact with the parts of the upper roll. The projections, as best shown in Figs. 12 and 13, are downwardly beveled or rounded. These fingers or projections may be consolidated into one continuous edge extending from end to end of the bar, 23, and a good result can be secured with such an edge if it is sufficiently pliable or flexible. But I prefer to use a plurality of relatively narrow fingers or projections and to make these adjustable upon the bar, 23, as best shown in Figs. 12 to 15. The edge of the bar 23, is provided with a groove, 23''', in which I place the parts, 28, the latter obviously, being transversely adjustable in said grooves. For certain uses the projections, 28, may be made of polished metal or the exposed tops and ends thereof may be sheathed with metal, but as a rule I prefer to make the projections of rubber. They are molded from the best of rubber, and in molding them I inlay a strip or sheet of perforated metal, 28', clearly shown in Fig. 13, which adds strength to the rubber pieces and provides a metallic wearing edge at the lower exposed part of the projection. As before stated the top and end of the projection form an incline or curve, 28'', and I prefer that this shall terminate slightly below the upper edge, 23'''', of the bar 23, or on a level therewith. These projections, 28, and the rubber parts or bands, 27, may be arranged directly opposite one another, but a much better result is secured by arranging them in the manner shown in Figs. 12 and 15. That is, I preferably stagger the rubber bands and the projections and so adjust the bar, 23, with respect to the upper roll, that the staggered projections relatively overlap upon an intermediate parallel line. The effect of this arrangement is that the envelop which is passing between the projections, 28, and the roll (the first or top envelop in the holder) is crimped along its edge, which crimping increases the effective thickness of the first envelop and causes it to force and hold the second envelop back upon the tops of the projections, 28, as shown in Fig. 15. In Fig. 15, $E^1$, represents the first envelop, and $E^2$, the second envelop in the holder. By moving the bar, 23, with its projections toward or from the adjacent roll sections, the irregular exit or feeding gap, last above described, may be adjusted to different thicknesses of paper. Stiff sheets of paper or cardboard will not pass through the gap if the opposed projections, 27 and 28, too sharply crimp, bend or wave the end of the sheet, and in such cases I reduce the number of projections and increase the longitudinal spacing thereof, by shifting the parts, 27 and 28, upon the rolls and the bar. It will be evident that in printing narrow cards and envelops, only the projections adjacent to the ends of the printing roll proper, come into use. The outlying projections serve with wider sheets or envelops and their number and arrangement may be varied according to the work in hand.

Figures 9, 10, 11:
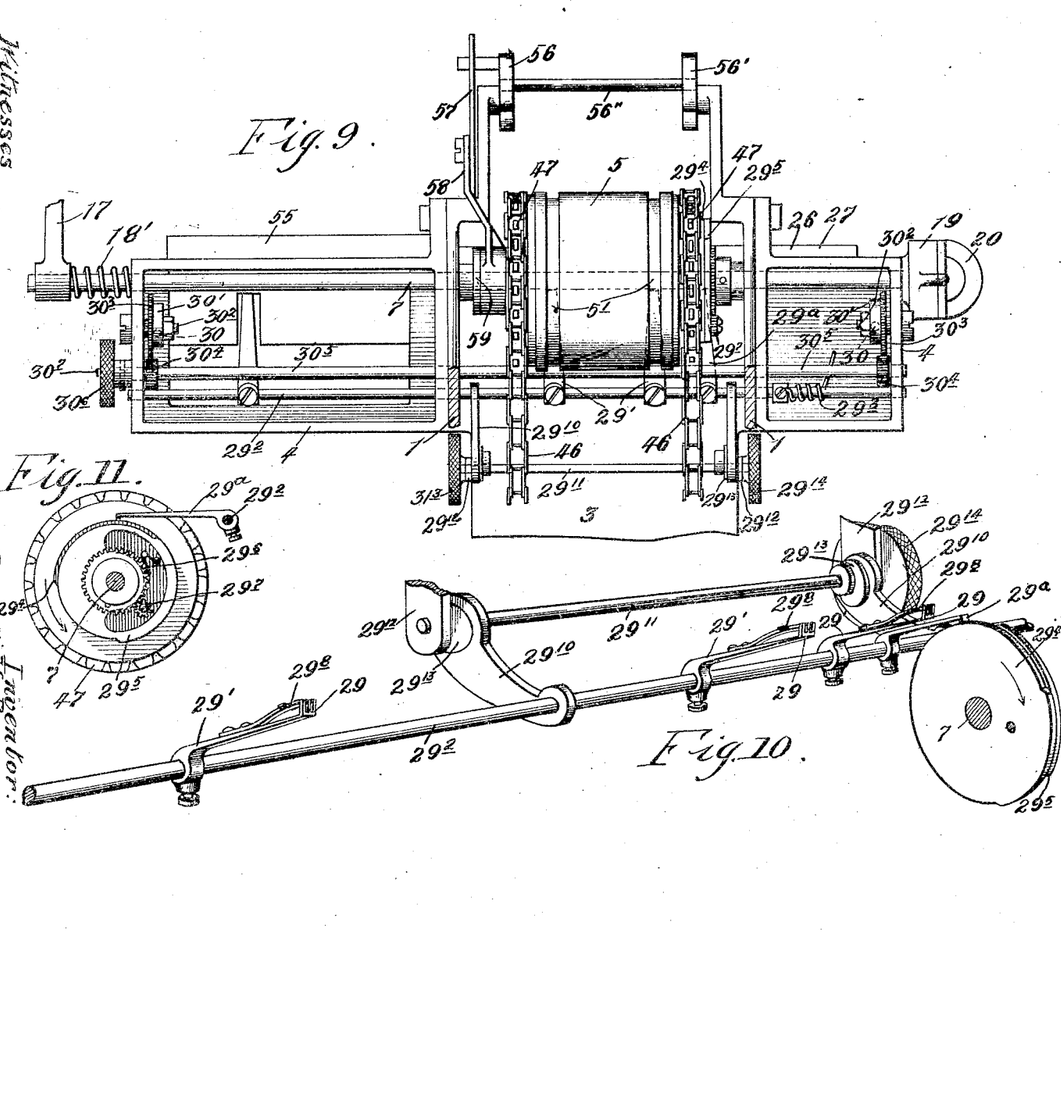
Fig. 9 is a plan section substantially on a line XIII—XIII of Fig. 2.
Fig. 10 is an enlarged perspective view of the envelop stop fingers, or dogs, with the means for actuating and regulating the same.
Fig. 11 is an end view of the larger or lower printing roll, showing the adjustable stop actuating cam generally disclosed in Fig. 10.

The projections, 28, stand opposite the lower inner side of the upper roll and in addition to moving them back and forth toward the roll, for different thicknesses of paper, I adapt them for vertical adjustment, to secure the best effects with different qualities of paper. It is necessary that the bar, 23, be supported above the bed plate of the machine, so that the type plates may pass beneath it and enter the rolls. The bar is thus supported by posts, 30, at its ends and by hangers, 31, above and back of the bar. The upstanding pillars, $1^9$, of the side frames hold the bar, 23, against endwise movement. The hangers pivotally support the rear edge of the bar and are the connections through which the bar may be shifted to and from the upper roll. The forward and back adjusting device comprises a cross shaft 31', and cam $31^2$, supported above the bed plate by upstanding brackets on the side frames. The cams, $31^2$, work in the hangers, 31, which form the straps thereof, as shown. A graduated thumb wheel, $31^3$, having a pointer, $31^4$, facilitates accurate adjusting of the bar, 23, with its projections, 28. The friction of the parts may be depended on to retain them in adjustment. The hangers, 31, are widely separated, and with the other parts of the bar supporting and actuating mechanism perform the useful function of holding the bar, 23, in exact parallelism with the upper roll, as clearly represented in Fig. 3. Furthermore, the cams, $31^2$, in rotating, raise and lower the rear edge of the bar, 23, and hence make it possible to incline the bar, transversely, to most delicately adjust this part of the envelop holder. The posts, 30, are utilized for vertically adjusting the forward edge of the feed bar, 23, as shown in Figs. 4 and 9, each post rests on a small cam, 30', supported by a stud, $30^2$, in the end of the lateral, 4. A gear wheel, $30^3$, is provided on each cam; these meshing with pinions, $30^4$, on a cross shaft, $30^5$, arranged in the frame beneath the bed plate. A graduated thumb wheel, $30^6$, having a pointer, $30^7$, is the device used for rotating the shaft, $30^5$. Such rotation obviously, according to direction, works the posts, 30, up or down and raises or lowers the feed bar. Gravity is not depended upon to hold the bar on the top of posts, 30. The bar if desired may be positively attached to the top of the posts, but I find it preferable to omit such connections and use springs, $23^5$, attached to the pillars $1^9$, for constantly pressing the bar, 23, onto the posts, 30. By removing the springs, $23^5$, the forward edge of the bar is freed, and the latter, pivoting on the shaft, 31', may be raised to expose the projections or envelop restraining device, 28. It is usually necessary to remove the upper roll before the bar, 23, may be raised, but none of the adjustments need be changed. During the use of the machine the rolls, 5 and 6, rotate in the direction of the arrows; their adjacent surfaces moving forwardly. With proper adjustment of the envelop feed member, the upper roll, (including the parts 26 and ) constantly engages the first or top sheet in the holder. The friction of the rubber surfaces, 27, of the roll upon the envelop or sheet is greater than the friction between that envelop and the next. In consequence the first or uppermost envelop of the pack, if free, will be drawn down by the rotating feed roll; and on the passage of one envelop, the roll will begin to act on the next. It follows that a continuous stream of envelops will be fed through the gap unless means are used to interrupt or intermittently nullify the action of the feed roll. As it is not desirable to intermit the rotation of the upper or feed roll, and as the type plate feed is intermittent, I provide mechanism for momentarily staying or delaying the exit of each envelop and holding it until a type plate arrives beneath it. Another purpose of the intermitting mechanism is to free each envelop somewhat in advance of the arrival of the type plate, so that the imprint may be properly positioned on the face of the envelop, not at the end thereof. As better explained hereinafter, I make the intermitting mechanism adjustable so that the envelop may be freed at any desired moment, before printing begins, which enables the operator to place the address on the envelop at that point which appears best. The dogs, 29, are the chief part of this intermitting or hold back mechanism. As shown in the drawings there are two or more of these dogs, each having an upturned or hooked end to work up and down beneath the upper roll. When raised they stand in the path of the envelop and nullify the tractive effort of the feed roll, holding back the end of the envelop as shown in Fig. 6. On the approach of a type plate the dogs are lowered and thus disengaged from the envelop, allowing the feed roll to propel the envelop forward. Any suitable number of feed dogs may be used; three are sufficient, even for the widest sheets. I prefer to locate two of the dogs over the roll, 5, and to make room for them, provide the roll with the grooves, 5¹. A third dog may be located within the lateral, 4, which has an opening in its top, through which the dog may work, as shown in Fig. 9. The dogs are preferably formed on arms, 29', all of which are fastened on a single rock shaft, 29², so that they may be worked simultaneously from a single point. The dogs are adjustable on the rock shaft, 29², but after adjustment are rigidly fixed thereon. A torsion spring, 29³, on the rock shaft, 29², (see Fig. 9) normally holds the dogs in depressed condition. Positive means, comprising a rocker arm, 29ᵈ on the shaft 29², and a cam, 29⁴, on the shaft, 7, are employed for positively raising the dogs and holding them in raised position until the moment for the release of the envelop.

Figures 7, 8:
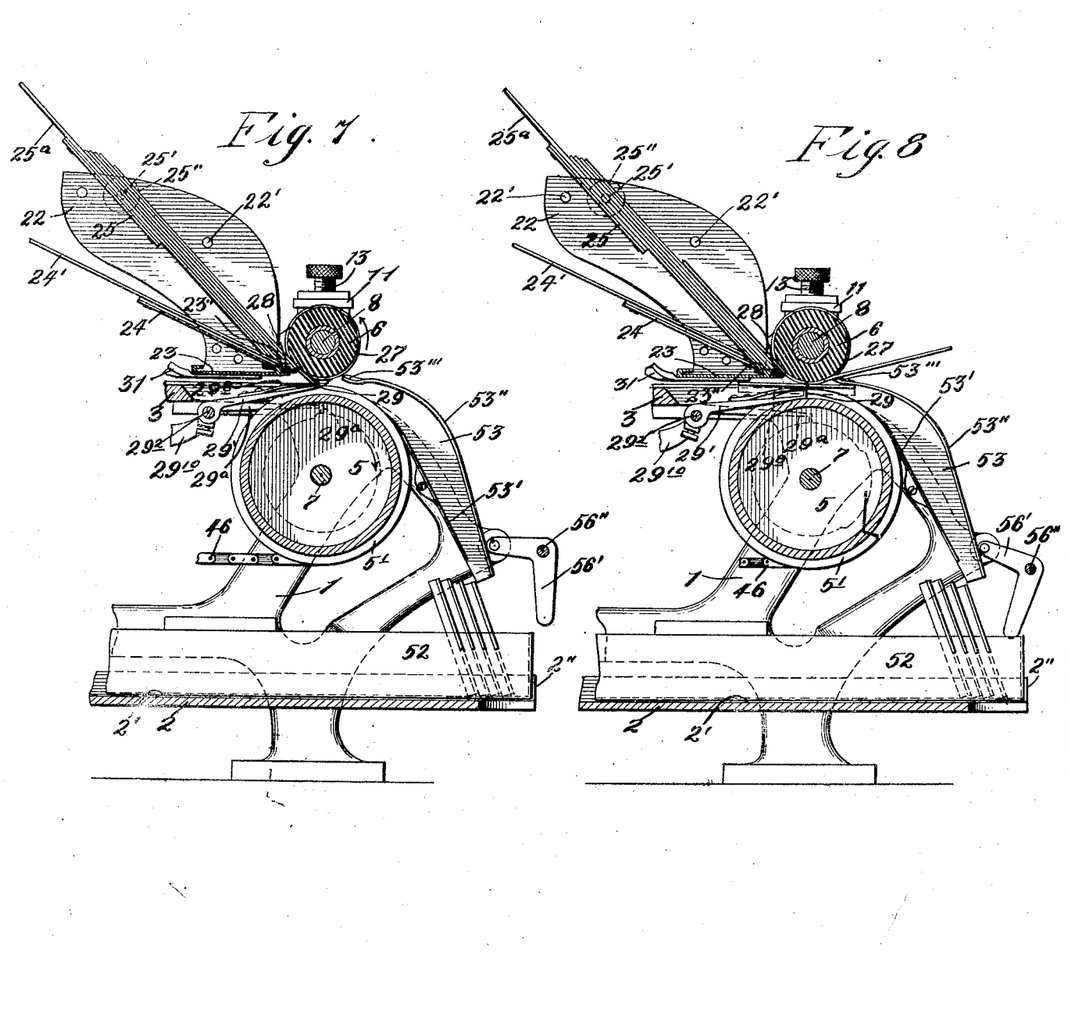

The parts 29ᵃ, and 29⁴, constitute the timing and operating mechanism and to the end that the time of release may be varied, I provide the cam, 29⁴, with a movable section, 29⁵, which controls the moment of the drop or release of the dogs. The part, 29⁴, which is fixed on the shaft, 7, controls the moment of the rise of the dogs to interrupting position, which moment is constant in successive revolutions. The fixed member, 29⁴, of the cam is conveniently fastened to the end of roll, 5. The shiftable member, 29⁵, is journaled on the shaft 7 and is adjustably attached to the fixed member; as by a detent, 29⁶, on the part 29⁴, engaged with gear teeth on the part, 29⁵. A small pinion, 29⁷, accommodated by a slot in 29⁵, and held by a stud projecting from 29⁴, meshes with the gear on 29⁵, is used to rotatively adjust the cam part 29⁵. The pinion, 29⁷, has a slot to receive a screw driver bit, by which it may be turned when the roll is stationary. The rise of the cam, 29⁴, has a fixed relation to the type plate conveyer and is so positioned that the dogs are elevated the instant after the passage of the type plate and preferably just before the rear end of the envelop passes the dogs, so that the latter will be in position to catch the next envelop. The rocker arm, 29ᵃ, as shown in Figs. 10 and 11, is thin and flexible, acting as a spring between the actuating cam and the dogs. Each dog is equipped with a light clearance spring, 29⁸, the end of which is slidably interlocked with the dog, 29 (see Fig. 10). These springs yield when struck by the end of an envelop, as in Fig. 7, but serve to quickly disengage the envelop from the dogs when the latter are lowered (see Fig. 8). Slight back and forth adjustment of the dogs is desirable and I, therefore, fix the rock shaft in bearings which hold the shaft in parallelism with the other shafts, yet allow it to move back and forth. The shaft 29², is supported by the frame, which contains slots, 29⁹, therefor (see Figs. 1 and 4). The journal bearings of the shaft are in two members, 29¹⁰, by which the same is linked to a parallel shaft, 29¹¹, held in brackets, 29¹², on the side frames. Small cams, 29¹³, form the actual connections between the member 29¹⁰ and the shaft 29¹¹. The shaft has a graduated thumb wheel, 29¹⁴, and by turning this the rock shaft may be moved forward or back, to shift the dogs between the printing rolls.

Figure 1:
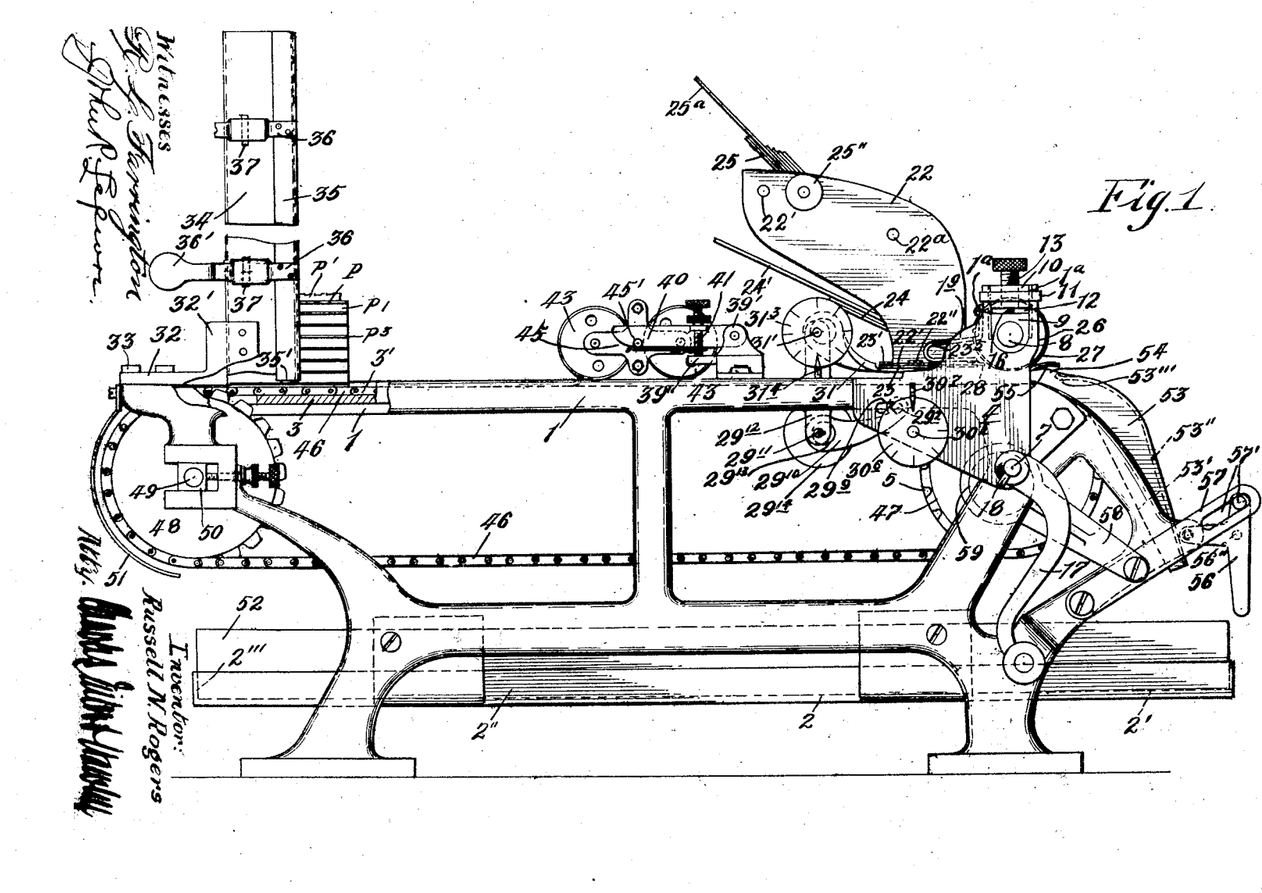
Figure 1 is a side elevation of an addressing machine embodying my invention.
Figure 2:
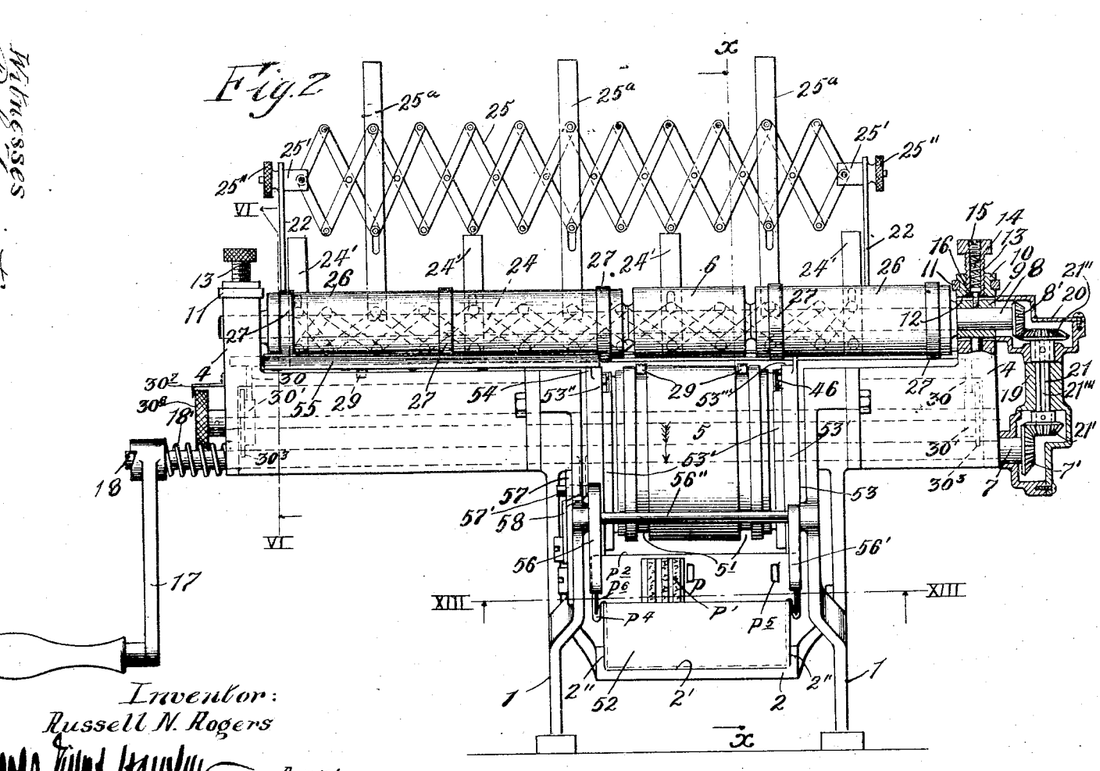
Fig. 2 is a front end elevation of the machine.
Figure 3:
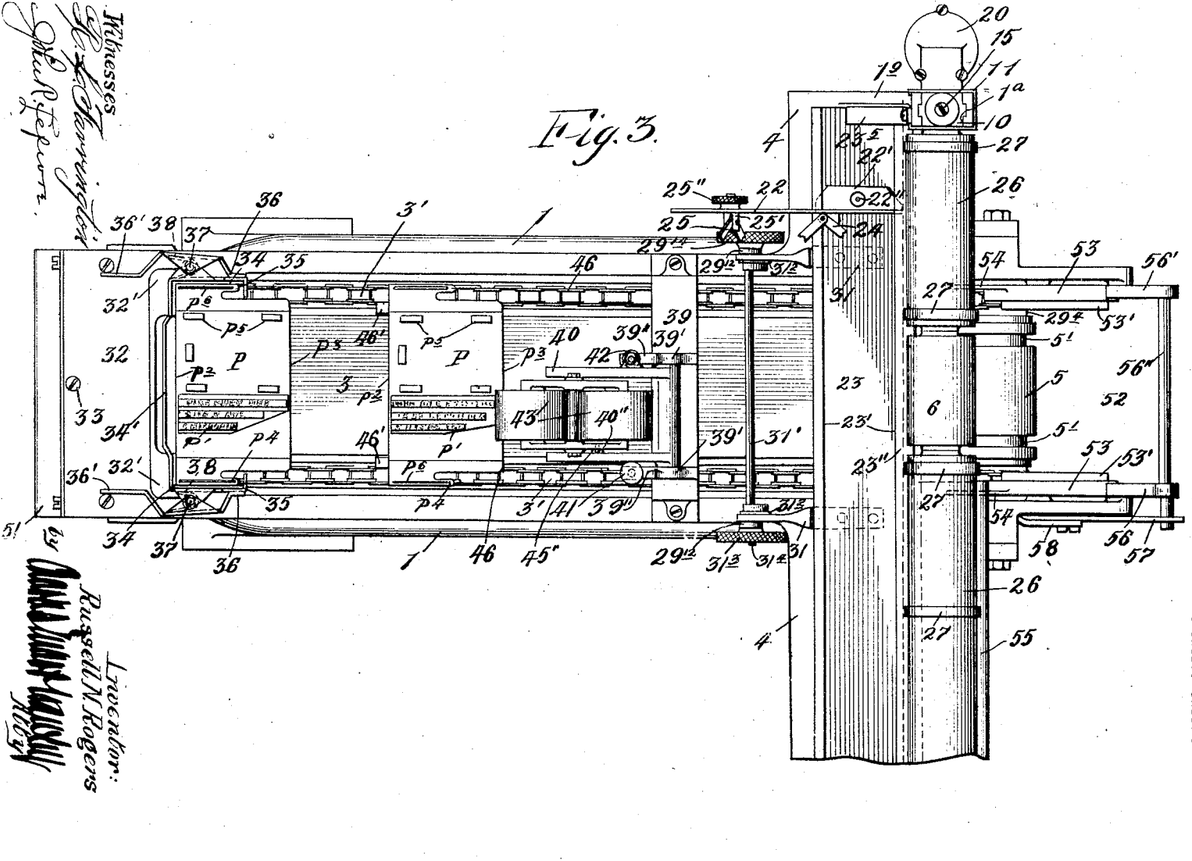
Fig. 3 is a plan view of the machine.
Figures 4, 5, 6:
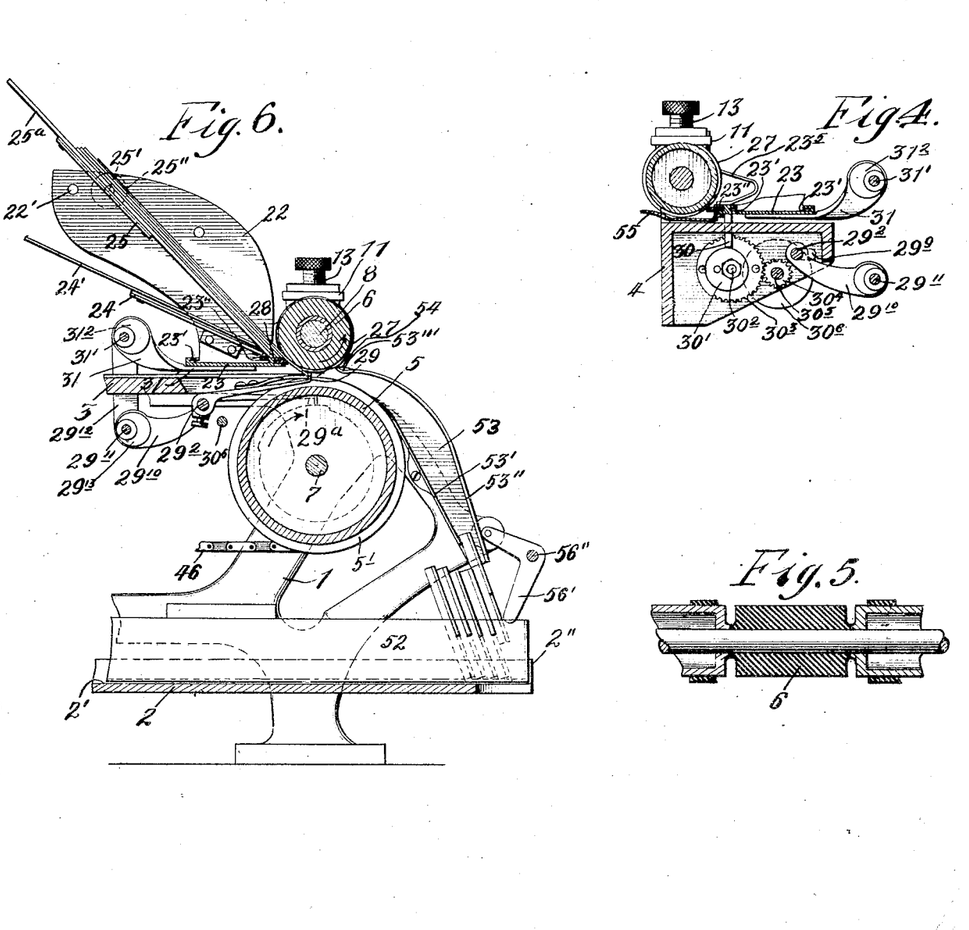
Fig. 4 is a vertical section on the line VI—VI of Fig. 2, viewed in the direction of the arrows.
Fig. 5 is a longitudinal section of the envelop or paper feeding rolls.
Figs. 6, 7 and 8 are vertical longitudinal sections of the front portion of the machine, on the line X—X of Fig. 2, showing the parts in several positions.

The type plate magazine appears in Figs. 1 and 3. The magazine is placed upon the rear end of the frame and has a base, 32, which is rigidly but detachably secured to the bed plate 3, of the frame by a number of screws, 33. The base has upstanding corner brackets, 32', and rising from these are angle bars, 34, having their upper ends connected by a back bar, 34'. These bars, extend down to the bed plate and receive the stack of type plates as shown in Figs. 1 and 3. Each type plate comprises a thin metal plate, P, having two relatively deep ribs, p', on its underside or back, the same being formed by crimping and folding the plate. The plates when stacked as in Fig. 1, present their ribs downwardly, one resting on the other, and the ribs of each holding it off of the type on the other. The rear or upper edge, P², of the plate is longer than the lower edge, P³, and arms or ears, P⁴, are formed on the ends of the plate. The plate is preferably wider than it is long, and the type, P', here shown as made of rubber, are arranged longitudinally on the plate. Lugs, P⁵, are struck up from the plate to hold a card bearing the index or name of the person represented by the type. To hold the plates in the magazine, the uprights, 34, are equipped with movable flanges, 35, in the form of angle bars, which have arms, 36, attached to the uprights by pivots, 37. Springs, 38, normally hold the angles or flanges, 35, in the positions shown in Fig. 3, where they engage the lugs or ears of the plates and prevent the plates from falling out. Two of the arms, 36, are extended to form levers, 36', which may be grasped to open out the flanges, 35, and admit a stack of plates to the magazine. The lower ends, 35', of the angle bars or flanges, 35, stop short of the bed plate to permit the bottom plate to pass out of the magazine while preventing the escape of two at a time.

*The type inking mechanism.*—The type plates are moved across the bed plate from the magazine to the printing roll, and to ink the type during this movement, I employ the inking mechanism shown in Figs. 1, 3. A bridge bar, 39 crosses the bed plate and is fastened on the frame, the space between the plate and the bar being sufficient to admit a type plate. Lugs, 39' and 39", extend upwardly and rearwardly from the bar, 39.

40 is a light yoke pivoted on the lugs, 39'. A limiting screw, 41, on one side of the yoke, 40, bears on one of the lugs, 39". A spring, connects the other side of the yoke with the other lug, 39", to hold the yoke down.

43 and 43 are hollow perforated inking rolls, covered with felt and held in a small frame, 45. The roll frame, 45, is pivoted in the ends of the yoke, 40, having trunnions, 45', in the snap spring bearings thereof (see Fig. 1). The stop screw, 41, holds the rolls out of contact with the bed plate and in position to be successively engaged by a moving type plate. Stops, 45" and 40", limit the movement of the roll frame in the yoke. The inking mechanism is set at one side over the bed plate to correspond with the position of the type on the plates.

*The type plate conveyer.*—Various devices, all within the scope of my invention may be employed for moving the type plates from the magazine to the printing rolls at desired intervals, but as the simplest and most effective device, I prefer the endless conveyer shown in the drawings. This conveyer comprises two link belts, 46, which run in the grooves, 3', of the bed plate. These belts are carried by sprocket wheels, 47 and 48. The sprockets, 47, are preferably arranged on the roll, 5, and are of such size that the tops of the belts are about flush with the periphery of the roll, 5, to prevent interference with the printing. The sprockets, 48, are placed on a shaft, 49, which is held in adjustable bearings, 50, at the rear end of the frame. The positions of these parts are such that the upper legs or reaches of the belts run smoothly in the bed plate grooves, 3'. Obviously, the conveyer will be driven by the rotation of the roll, 5, and crank 17, the top of the belt moving toward said roll. At intervals the belts are provided with lugs, 46', which run in the grooves, 3', and engage the ribs of the bottom type plate in the magazine. When moved they, therefore, serve to expel that plate from the magazine and move it forward beneath the inker. During this movement the engagement of the ribs of the plate with the edges of the bed plate aids in holding the type plate in proper position. The rear end of the conveyer is covered by a suitable guard plate, 51, attached to the frame.

The type plate receiver, includes the plate drawer, 52, which rests on the shelf, 2, and the curved deflectors, 53, at the discharge side of the printing mechanism. The deflectors, 53, are arranged directly in front of the roll, 5, adjacent to the ends thereof, in position to receive the ends of a type plate as it emerges from the rolls. The parts, 53, are separate pieces which are attached to the front ends of the side frames, shaped to receive them. Each part, 53, is characterized by a substantially straight flange, 53', and a curved flange, 53", having an upwardly turned end, 53''', adjacent to the top roll. The flanges are so formed as to gently deflect the emerging plate and turn it downwardly into the forward end of the plate drawer, 52, as shown in Figs. 10, 11 and 12. To prevent envelops from passing into or catching upon the deflector flanges, and to lift the paper from the type as quickly as possible after printing, I provide a rise or cam surface, 54, at the side of each part, 53, the same acting in the manner depicted in Figs. 11 and 12. At points beneath the rolls, 26, these cam surfaces, 54, are supplemented by suitable curved plates, 55 (see Figs. 1 and 9).

*The type plate repacker.*—The function of this portion of the mechanism is to clear the lower end of the plate chute (the deflectors), 53, so that one plate after another may fall into the drawer. This is done by pushing each plate backwardly in the drawer as soon as it falls thereinto. As shown, the lower parts of the plates fit between the sides of the drawer, while the ears thereon overhang the edges of the drawer and support the plates in inclined positions therein. Riding on the edge of the drawer in this manner, the plates are easy to shift; even when the drawer has been nearly filled with plates. The clearing, shifting or packing mechanism is of simple, durable construction comprising two bell cranks, 56, 56', joined by a rod 56", and pivoted on the forward ends of the machine frame. The lower ends of the bell cranks are so positioned that when swung backwardly they engage the lugged ends of the plate last to drop from the deflectors or chute, the bell cranks being above and at the sides of the drawer. It may be remarked that the lugs or ears of the plates are strengthened by struck up ribs, P⁶. These receive the blow of the bell cranks. The bell cranks are actuated by a lever, 57, pivoted on the side of the frame and itself actuated by an eccentric rod, 58, the strap of which incloses the eccentric, 59, located on the shaft, 7, at the end of roll, 5. A slot and pin connection, 57', is used between the bell crank, 56 and the lever, 57, (see Fig. 1). This manner of driving bell cranks affords a quick rearward movement thereof to clear the chute, with a delayed forward movement, which avoids interference with any plate not yet free from the chute or deflectors.

The operation of the herein described machine is as follows: A drawer like unto, 52, filled with type plates, is upended in front of the plate magazine. By means of the pinch levers, 36', the flanges or wings of the magazine are opened to admit the plates and the vertically positioned drawer is pushed back until the stack of plates is between the uprights. The flanges, being then released, close in upon the ears of the plates and secure them in the magazine; whereupon the drawer may be taken away. The empty drawer is then placed on the shelf, 2, in the lower part of the machine, in readiness to again receive the same plates, in the order in which they are extracted from the magazine. Following the lodgment of the plates in the magazine a pack of envelops or sheets is placed in the envelop holder, and with the lower end of the first envelop resting against the upper printing roll, the operator sets the machine in motion by turning the crank, 17. This motion is communicated to the lower and upper rolls, the cam, 29⁴⁻⁵, the conveyer, and the repacking device. A pair of lugs upon the conveyer soon engage the bottom plate in the magazine and force it out upon the bed, as depicted in Fig. 3, whence the plate passes under first one inking roll and then the other receiving ink therefrom. From the inking mechanism the plate continues on to the printing roll. Prior to the arrival of the plate at the printing rolls the upper drawing roll will have drawn the first or uppermost envelop down past the projections or restraining devices, 28 into contact with the stop dogs, 29, which are in raised position at such time. The first envelop in passing the staggered projections, 27, 28, forces the end of the second rearwardly away from the feed gap, holding it against entrance thereto, an operation which is facilitated by the clinging effect of the rubber projections, 28, upon the edge of the second envelop. As the plate approaches the stopped end of the envelop, the stop dogs are lowered or retracted by the action of the cam 29⁴—29⁵; as a result the envelop starts between the rolls and will partly emerge therefrom before the type plate reaches it, as depicted in Fig. 12. The pressure of the envelop on the inked type follows, as the two pass between the rolls. The cam surface at the discharge side of the rolls and the plate deflectors, 53, serve to separate the envelop and the plate as they are discharged. The plate falls through the chute into the front end of the drawer, where it is immediately engaged and pushed back by the bell cranks, 56, 56'. Following the discharge of the plate from the rolls the remainder of the envelop passes therethrough and as its end leaves the projections, 28, it frees the end of the second sheet, allowing the latter to contact the roll. Meantime the dogs are returned to raised positions by their actuating cams and when the rubber bands or surfaces on the drawing roll pull down the second envelop, the dogs stop it and hold it to await the arrival of the next type plate. An envelop is thus printed by each turn of the crank, the operation continuing until all of the plates from the magazine are restored to the drawer. In its forward and upward position the bell crank packer is at a height which permits the filled drawer to be withdrawn. When all the envelops of one size have been printed or addressed the width of the envelop holder is adjusted to fit other envelops or sheets, in the manner before explained. Feeder adjustments, incidental to such change, may be readily made by manipulating the three thumb wheels, 29¹⁴, 31³, and 30⁶, and if need be the stop screws, 13, of the upper roll. If the second lot are longer or shorter, the adjustable or permutation cam, 29⁴—29⁵, should be altered accordingly, in the manner before described. In event there is a material change in the quality of the paper, or in the thickness thereof, the automatic envelop feeder may be accurately adjusted thereto by the longitudinal rearrangement of the rubber bands, 27, and the projections, 28, as before described.

As hereinbefore stated, my invention is not limited to the specific structure herein shown and described.

Having thus described my invention I claim as new and desire to secure by Letters Patent:

1. A feeder for printing machines having rotary printing mechanisms consisting of upper and lower parts, comprising, a feed bar mounted on the frame of the machine adjacent to the intake side of the printing mechanism parallel therewith and of greater width than the same, an expansible and contractible envelop holder mounted to support envelops above said bar, said holder being expansible to substantially equal the width of said bar, envelop drawing rolls adjacent to the upper part of the printing mechanism for extracting envelops from said holder and adapted to feed the widest envelop containable thereby, envelop stop-and-release dogs for intermitting the envelop feed, and suitable driving means, substantially as described.

2. The improvements herein described, comprising an envelop holder composed of relatively adjustable sides and an expansible and collapsible bottom inclined upwardly and rearwardly from the point of delivery, substantially as described.

3. The improvements herein described, comprising an envelop holder composed of relatively adjustable sides and an expansible and collapsible bottom, provided with parallel envelop bearing bars and inclining upwardly and rearwardly from the point of delivery, substantially as described.

4. The improvements herein described, comprising an envelop holder composed of relatively adjustable sides and an expansible and collapsible bottom, provided with parallel envelop bearing bars, and a feed bar forming the lower edge of said holder, substantially as described.

5. The improvements herein described, comprising an envelop holder composed of relatively adjustable sides and an expansible and collapsible bottom occupying an inclined position between said sides, in combination with a feed bar forming the lower edge of said holder, and a plurality of drawing rolls presenting their intake, lower sides, to said feed bar, substantially as described.

6. The improvements herein described, comprising an envelop holder composed of relatively adjustable sides and an expansible and collapsible bottom occupying an inclined position between said sides, in combination with a feed bar forming the lower edge of said holder, a plurality of drawing rolls presenting their intake, lower sides, to said feed bar, envelop stop-and-release means below said rolls, and driving mechanism for actuating said rolls and said means to intermittently feed envelops from said holder, substantially as described.

7. The improvements herein described, comprising a feed bar, in combination with envelop holder sides or wings relatively adjustable on said bar, envelop holder bottom forming bars occupying inclined positions between said wings and relatively adjustable therewith, said bars together forming the bottom of the holder, substantially as described.

8. The improvements herein described, comprising a feed bar, in combination with envelop holder sides or wings relatively adjustable on said bar, envelop holder bottom forming bars occupying inclined positions between said wings and relatively adjustable therewith, said bars together forming the bottom of the holder, projections on the edge of said feed bar and feed rolls arranged to coact therewith to feed envelops one at a time from said holder, substantially as described.

9. The combination with a holder arranged to support impression-receiving sheets in a rearwardly and upwardly inclined position, of a shaft, a plurality of roll sections on said shaft, frictional sheet feeding means thereon, a feed bar adjustably mounted contiguous to the lower and forward end of said holder, and a plurality of fingers or projections mounted at the forward end of said feed bar in staggered relation to said sheet feeding means and having convex ends curving forwardly and downwardly from the upper surface of said feed bar, said fingers being transversely adjustable to vary the transverse distance between said fingers and sheet feeding means to accommodate impression sheets of different thicknesses.

10. The combination with a holder arranged to support impression-receiving sheets in a rearwardly and upwardly inclined portion, of a shaft, a plurality of roll sections on said shaft, frictional sheet feeding means thereon, a feed bar adjustably mounted contiguous to the lower and forward end of said holder, and a plurality of fingers or projections mounted at the forward end of said feed bar in staggered relation to said sheet feeding means and having convex ends curving forwardly and downwardly from the upper surface of said feed bar, said sheet feeding means being transversely adjustable to vary the transverse distance between said fingers and sheet feeding means to accommodate impression sheets of different thicknesses.

11. The combination with a holder arranged to support impression-receiving sheets in a rearwardly and upwardly inclined position of a shaft, a plurality of roll sections on said shaft, frictional sheet feeding means thereon, a feed bar adjustably mounted contiguous to the lower and forward end of said holder, and a plurality of fingers or projections mounted at the forward end of said feed bar in staggered relation to said sheet feeding means and having convex ends curving forwardly and downwardly from the upper surface of said feed bar, said sheet feeding means and fingers being transversely adjustable to vary the transverse distance therebetween to accommodate impression sheets of different thicknesses.

12. The combination with a holder arranged to support impression-receiving sheets in a rearwardly and upwardly inclined position of a shaft, a plurality of roll sections on said shaft, frictional sheet feeding means thereon, a feed bar mounted contiguous to the lower and forward end of said holders, and a plurality of rubber fingers or projections mounted at the forward end of said feed bar in staggered relation to said sheet feeding means and having continuous ends curving forwardly and downwardly from the upper surface of said feed bar, said fingers and sheet feeding means being relatively adjustable to vary the transverse distance between the same to accommodate sheets of different thicknesses.

13. The combination with a holder arranged to support impression-receiving sheets in an upwardly and rearwardly inclined position, of a feed bar at the lower and forward end of said holder provided with a plurality of rubber fingers containing a metallic reinforcement, a shaft above and parallel with said bar, and a plurality of feed roll sections on said shaft and in staggered relation to said fingers to cause the sheet to be crimped as it passes between the fingers and roll sections, said fingers and roll sections being relatively transversely adjustable to vary the transverse distance between the fingers and roll sections to accommodate impression sheets of different thicknesses.

14. The improvements herein described, comprising a feed bar having a groove in its edge, in combination with a plurality of rubber projecting members having inclined ends and having thinner parts occupying said groove, substantially as described.

15. The improvements herein described, comprising a feed bar having a groove in its edge, in combination with a plurality of projecting members having inclined ends and having thinner parts occupying said groove, and a series of rubber faced drawing rolls, parallel with the grooved edge of said bar, substantially as described.

16. The improvements herein described, comprising an envelop holder, composed of a feed bar, in combination with a holder proper, expansible and collapsible with relation to said bar, said bar forming a portion of the bottom of said holder, a plurality of projecting members spaced from end to end of said bar and transversely adjustable on the edge thereof, and a series of drawing rolls parallel with and above the series of projections to coact therewith, substantially as described.

17. The improvements herein described, comprising an envelop holder, composed of a feed bar, in combination with a holder proper, expansible and collapsible with relation to said bar, said bar forming a portion of the bottom of said holder, a plurality of projecting members spaced from end to end of said bar and transversely adjustable on the edge thereof, a series of drawing rolls parallel with and above the series of projections to coact therewith, a plurality of stop-and-release dogs below said rolls, and means for actuating the same, substantially as described.

18. The improvements herein described, comprising an envelop holder, composed of a feed bar, in combination with a holder proper, expansible and collapsible with relation to said bar, said bar forming a portion of the bottom of said holder, a plurality of projecting members spaced from end to end of said bar and transversely adjustable on the edge thereof, a series of drawing rolls parallel with and above the series of projections to coact therewith, a plurality of stop-and-release dogs below said rolls, means for actuating the same, and means for varying the time of the action of said dogs, substantially as described.

19. The improvements herein described, comprising an envelop holder having an inclined bottom and provided with a plurality of envelop restraining projections on its feeding edge, in combination with a pair of printing rolls presenting their intake sides to said feeding edge, a plurality of rubber-tired rolls co-axial with the upper printing roll co-acting with said projections, means for adjusting said projections with respect to the upper feed roll and printing rolls, suitable stop and release dogs operating above the lower printing roll to first stop and then release each envelop after its edge passes said projections, and means for varying the length of the period in which said dogs are in their stop position.

20. The improvements herein described, comprising a shaft, in combination with a plurality of drawing rolls spaced upon said shaft, means for rotating said shaft and rolls, a feed bar parallel with said shaft, adjacent to the lower sides of said rolls, envelop restraining means on said bar, a roll coacting with said feed rolls, below the same, means for vertically adjusting said shaft, independent means for vertically adjusting said bar, and a suitable envelop holder for delivering envelops to said feed bar, substantially as described.

21. The improvements herein described, comprising a shaft, in combination with a plurality of drawing rolls spaced upon said shaft, means for rotating said shaft and rolls, a feed bar parallel with said shaft, adjacent to the lower sides of said rolls, envelop restraining means on said bar, a roll coacting with said feed rolls, below the same, means for vertically adjusting said shaft, independent means for vertically adjusting said bar, other means for adjusting said bar horizontally toward and from said feed rolls, and envelop stop-and-release means operable beneath said rolls, substantially as described.

22. The improvements herein described, comprising a feed bar, in combination with sides or wings upstanding therefrom and longitudinally adjustable thereon, a lazy tong bar having its ends attached to said wings and forming an inclined bottom to support envelops in an inclined position on said feed bar and a feed roll, substantially as described.

23. The improvements herein described, comprising a frame, in combination with parallel shafts mounted in said frame, spring pressed bearings for one of said shafts, independent means for adjusting said shafts toward and from one another, printing rolls intermediately positioned on said shafts and constantly separated, envelop drawing rolls on the upper shaft at the ends of the printing roll thereon, a feed bar parallel with the upper shaft, mechanism for adjusting said feed bar toward and from said shaft in both horizontal and vertical directions, and an adjustable envelop holder for delivering envelops to said drawing rolls, substantially as described.

24. The improvements herein described, comprising a suitably supported bar having envelop restraining devices at its edge, side plates or wings upstanding from said bar and adjustable longitudinally thereon, a lazy tong bar connecting said wings, and parallel motion bars carried by said lazy tong bar and inclined toward said edge of the bar, substantially as described.

25. The improvements herein described, comprising a suitably supported bar having a groove in its forward edge, in combination with envelop restraining means secured in said groove and projecting from the edge of the bar, and an envelop holder adjustable on the top of said bar, substantially as described.

26. The improvements herein described, comprising, a plurality of envelop drawing rolls, in combination with a feed bar coextensive therewith, a frame supporting said bar and rolls, envelop restraining means on the edge of said bar, coacting with said drawing rolls, envelop stop-and-release means below said rolls, and an envelop holder mounted upon said bar and collapsible and expansible longitudinally thereof, irrespective of said restraining means, substantially as described.

27. The improvements herein described, comprising an envelop holder composed of suitably supported side wings arranged for adjustment toward and from one another, in combination with a lazy tong bar movably connecting said wings and adjustable forward and back therein, substantially as described.

28. The improvements herein described, comprising an envelop holder composed of suitably supported side wings arranged for adjustment toward and from one another, in combination with a lazy tong bar movably connecting said wings and adjustable forward and back therein, said lazy tong bar being swiveled with respect to said wings, substantially as described.

29. The improvements herein described, comprising an envelop holder composed of relatively adjustable side wings, in combination with means supporting said wings, a lazy tong bar having its ends rigidly secured to said wings, and a lazy tong bar having its ends swiveled to said wings, and parallel motion strips upon the second lazy tong bar, having their lower ends resting on the first mentioned lazy tong bar, substantially as described.

30. The improvements herein described, comprising a feed bar, in combination with wings upstanding therefrom and longitudinally adjustable thereon, a lazy tong bar having its ends secured in said wings, parallel motion strips held by said lazy tong bar and resting on said feed bar, and a second lazy tong bar secured to said wings above the other and having parallel motion strips resting thereon, substantially as described.

31. The improvements herein described, comprising an envelop holder composed of a feed bar, in combination with wings upstanding therefrom and longitudinally adjustable thereon, an extensible and collapsible bar connecting the upper parts of said wings, and parallel strips or bars secured thereon, and with said feed bar forming the bottom of the envelop holder, substantially as described.

32. The improvements herein described, comprising an envelop holder having envelop restraining devices at its edge, in combination with a shaft parallel with said edge and above the same, drawing rolls on said shaft to coact with said restraining means, a second shaft parallel with the first shaft, below said edge, a plurality of stop-and-release dogs on said second shaft, a rocker arm and a permutation cam for actuating said arm to rock said second shaft, and means for rotating said cam and the first mentioned shaft, substantially as described.

33. The improvements herein described, comprising an envelop holder having envelop restraining devices at its edge, in combination with a shaft parallel with said edge and above the same, drawing rolls on said shaft to coact with said restraining means, a second shaft parallel with the first shaft, below said edge, a plurality of stop-and-release dogs on said second shaft, a rocker arm and a permutation cam for actuating said arm to rock said second shaft, means for rotating said cam and the first mentioned shaft, and means for adjusting said second shaft toward and from the first shaft to alter the relation of the dogs and rolls, substantially as described.

34. The improvements herein described, comprising an envelop feeding mechanism, in combination with a printing mechanism to receive envelops therefrom, a plurality of interposed stop-and-release dogs, a rock shaft whereon said dogs are arranged, an actuating cam for rocking said shaft in time with the action of said printing mechanism, a revoluble shaft parallel with said rocking shaft, and parallel cams thereon for adjusting said rocking shaft in a horizontal plane, substantially as described.

35. The improvements herein described, comprising a frame, in combination with a shaft having bearings therein, envelop drawing rolls on said shaft, a feed bar parallel therewith and provided with envelop restraining projections for coaction therewith, supports for the forward and rear edges of said bar, means for raising and lowering the forward edge of said bar, and mechanism maintaining the parallelism of the bar and adapted to move the bar horizontally, substantially as described.

36. The improvements herein described, comprising a frame, in combination with a shaft mounted therein, feed rolls spaced upon said shaft, a feed bar having an envelop restraining edge for coaction with said rolls, a holder for supporting envelops in inclined position upon said bar, a shaft parallel with the first mentioned shaft, cams simultaneously operable thereby to raise and lower the forward edge of said bar, and horizontally adjustable pivotal supports for the rear edge of said bar, substantially as described.

37. The improvements herein described, comprising a frame, in combination with parallel shafts in said frame, printing rolls intermediately located on respective shafts, drawing rolls spaced upon the upper shaft, a rocking shaft parallel with and adjacent to the intake sides of said rolls, a plurality of stop-and-release dogs fixed on said rocking shaft for coaction with said drawing rolls, means maintaining the parallelism of said rocking shaft and adapted to adjust the same toward and from the other shafts, an adjustable cam on one of the printing roll shafts for rocking said rocking shaft, a feed bar coextensive with the rolls upon the upper shaft, cams supporting the forward edge of said feed bar, a rotary shaft for simultaneously actuating the supporting cams, hangers for the rear edge of the feed bar, a shaft for simultaneously adjusting said hangers to shift the bar horizontally, and a suitable envelop holder, substantially as described.

38. The improvements herein described, comprising rotary envelop drawing means, a feed bar parallel therewith, an envelop holder mounted on said bar, means maintaining the parallelism of the bar and adapted for simultaneous operation to raise and lower the feeding edge of the bar, and other means also maintaining the parallelism of the bar and adapted to shift the bar horizontally and alter the inclination of the bar and envelop holder, substantially as described.

39. The improvements herein described, comprising a shaft, in combination with a plurality of rubber tired drawing rolls thereon, a feed bar parallel therewith and having a groove in its edge adjacent thereto, and a plurality of rubber projections secured in said groove and each containing a metallic reinforcing strip exposed as the forward edge thereof, substantially as described.

40. The improvements herein described, comprising an envelop holder, in combination with envelop withdrawing means for extracting envelops one by one from said holder, a plurality of stop dogs, a clearance spring on each, and means for simultaneously actuating said dogs, substantially as described.

41. In an addressing machine, a frame, in combination with a conveyer for type plates, a feed bar, pivotal supports whereby the rear edge of said feed bar is attached to said frame and supported above said conveyer, suitable means adjustably supporting the forward edge of said feed bar, envelop restraining projections on the forward edge of said bar, a coacting roll adjacent to the forward edge of said feed bar, and bearings for said roll on said frame formed to permit the forward edge of the feed bar to be raised to facilitate the inspection and adjustment of the projections thereof.

42. The improvements herein described, comprising an envelop holder composed of relatively adjustable sides, an expansible and collapsible bottom inclined upwardly and rearwardly from the point of delivery, and means for varying the inclination of said bottom.

43. The improvements herein described, comprising a platform having a groove in its edge, a drawing roll at the delivery end of said platform, and a plurality of rubber projections having inclined ends extending beyond said platform and having portions thereof occupying the groove in the edge of the platform and arranged in close proximity to said drawing roll.

44. The improvements herein described, comprising an envelop holder composed of a feed bar in combination with an expansible and collapsible holder, said bar forming a portion of the bottom of said holder, a plurality of projections spaced from end to end on said bar and transversely adjustable on the edge thereof, and a drawing roll parallel with and above said series of projections having enlarged portions arranged to co-act therewith.

45. The improvements herein described, comprising a shaft in combination with a drawing roll on said shaft, means for rotating said shaft and roll, a feed bar parallel with said shaft adjacent to the lower side of said roll, means for vertically and horizontally adjusting said bar, and envelop stop and release means operable beneath said roll.

In testimony whereof, I have hereunto set my hand this 25th day of September, 1909, in the presence of two subscribing witnesses.

RUSSELL N. ROGERS.

Witnesses:
CHARLES GILBERT HAWLEY,
JOHN R. LEFEVRE.